(12) United States Patent
Petersen et al.

(10) Patent No.: US 10,513,323 B2
(45) Date of Patent: Dec. 24, 2019

(54) SYSTEMS AND METHODS FOR CONTROLLING MOISTURE INGRESS IN AIRCRAFT SKIN MOUNTED ELECTRONICS

(71) Applicant: THE BOEING COMPANY, Chicago, IL (US)

(72) Inventors: Robert M. Petersen, Bonney Lake, WA (US); Heath Michael Olinger, Mount Pleasant, SC (US); Robert Steven Graybill, Mount Pleasant, SC (US)

(73) Assignee: THE BOEING COMPANY, Chicago, IL (US)

( * ) Notice: Subject to any disclaimer, the term of this patent is extended or adjusted under 35 U.S.C. 154(b) by 469 days.

(21) Appl. No.: 15/400,449

(22) Filed: Jan. 6, 2017

(65) Prior Publication Data
US 2018/0194450 A1    Jul. 12, 2018

(51) Int. Cl.
*B64C 1/06*    (2006.01)

(52) U.S. Cl.
CPC .................. *B64C 1/067* (2013.01)

(58) Field of Classification Search
CPC .. B64C 1/067; B64C 1/14; B64C 1/18; B64D 2221/00; B64D 45/00; H02G 3/0633; H05K 5/0221
See application file for complete search history.

(56) References Cited

U.S. PATENT DOCUMENTS

| | | | | |
|---|---|---|---|---|
| 5,290,996 | A * | 3/1994 | Giamati | B64C 1/1453 219/201 |
| 6,538,219 | B2 * | 3/2003 | Poetter | G01P 15/06 200/61.08 |
| 6,776,183 | B1 * | 8/2004 | Brooker | B64C 1/1453 137/216 |
| 7,546,981 | B2 * | 6/2009 | Hoffjann | B64C 1/1453 244/136 |
| 8,857,562 | B2 * | 10/2014 | Morgan | B64C 1/403 181/284 |
| 9,718,531 | B2 * | 8/2017 | Gaudreau | B64C 1/1453 |
| 10,023,286 | B2 * | 7/2018 | Dickson | B64C 1/40 |
| 10,100,742 | B2 * | 10/2018 | Pearce | B64D 37/005 |
| 2003/0221851 | A1 * | 12/2003 | Motzigkeit | B64C 1/18 174/651 |

(Continued)

FOREIGN PATENT DOCUMENTS

JP    2013233012 A    11/2013
WO    0236426 A2    5/2002

(Continued)

OTHER PUBLICATIONS

European Search Report for European Application No. 17203034 dated Apr. 16, 2018.

*Primary Examiner* — Medhat Badawi
(74) *Attorney, Agent, or Firm* — Coats & Bennett, PLLC

(57) ABSTRACT

A system for controlling moisture ingress in aircraft skin mounted electronics, comprising: a moisture diverter comprising a substantially planar base flange, configured to sealingly engage an underlying surface of an interior structure of an aircraft, and, a shroud having a moisture impermeable wall extending inboard from the base flange and defining an enclosure therein for enclosing an electrical connector.

20 Claims, 11 Drawing Sheets

(56) References Cited

U.S. PATENT DOCUMENTS

| | | | |
|---|---|---|---|
| 2004/0175516 A1* | 9/2004 | Schmitz | B64C 1/067 428/34.1 |
| 2006/0273224 A1* | 12/2006 | Hoffjann | B64C 1/1453 244/136 |
| 2007/0199188 A1* | 8/2007 | Barker | B64C 1/1415 29/33.2 |
| 2009/0090812 A1* | 4/2009 | Boock | B64C 1/40 244/1 N |
| 2010/0032525 A1* | 2/2010 | Piesker | B64C 1/1453 244/136 |
| 2011/0121137 A1* | 5/2011 | Sandiford | B64C 1/1453 244/136 |
| 2012/0222880 A1* | 9/2012 | Dinh | H02G 3/088 174/50 |
| 2013/0299630 A1* | 11/2013 | Redecker | B64C 1/067 244/1 N |
| 2014/0083734 A1* | 3/2014 | Magno, Jr. | H05K 5/0221 174/50 |
| 2014/0182877 A1* | 7/2014 | Jolly | H02G 3/088 174/67 |
| 2014/0262614 A1* | 9/2014 | Rushin | B65D 11/10 182/48 |
| 2016/0359305 A1* | 12/2016 | Hemingway | H02G 3/081 |
| 2018/0194450 A1* | 7/2018 | Petersen | B64C 1/14 |

FOREIGN PATENT DOCUMENTS

| | | | |
|---|---|---|---|
| WO | 0236426 | A3 | 5/2002 |
| WO | 2014135938 | A1 | 9/2014 |

* cited by examiner

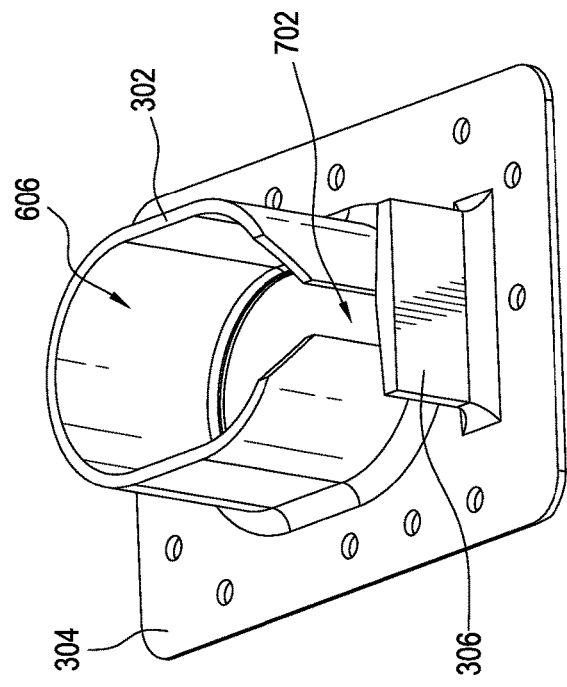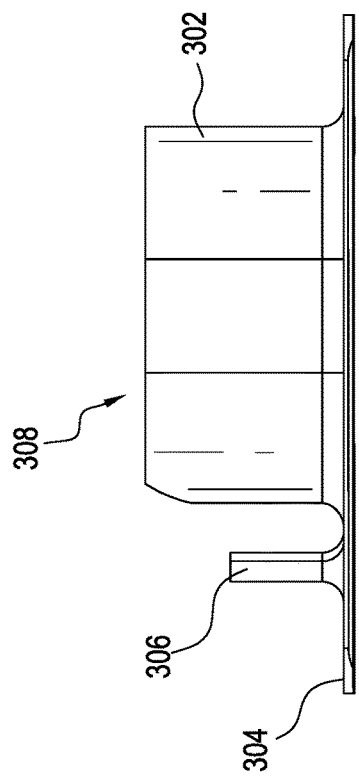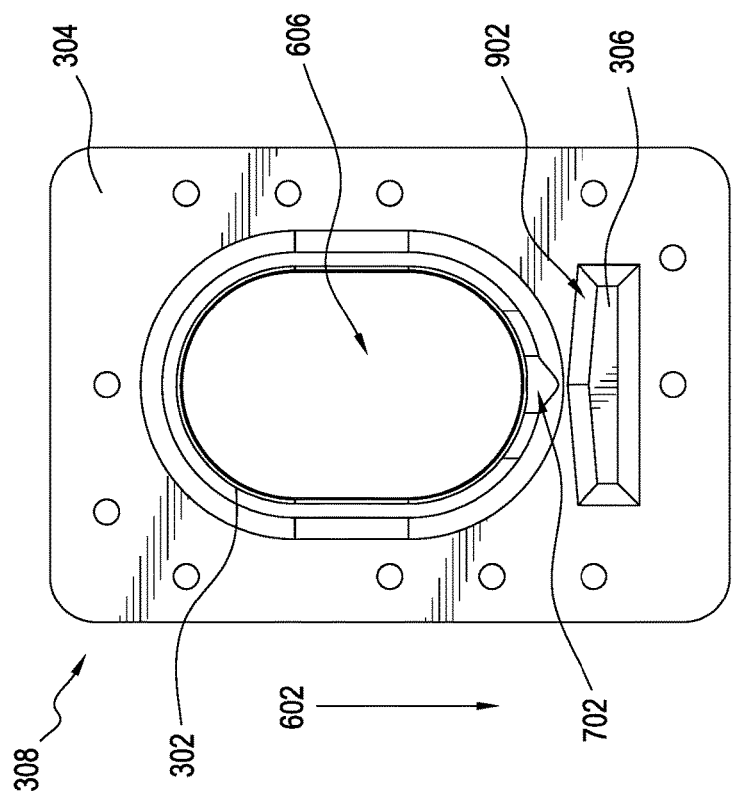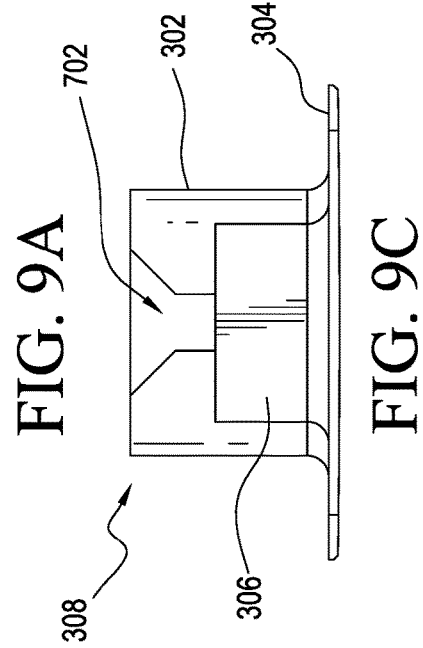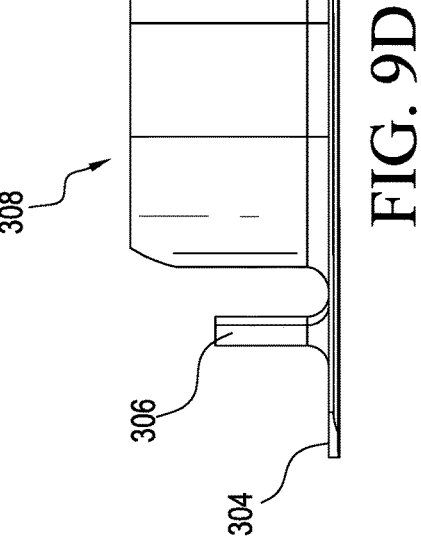
FIG. 9A
FIG. 9B
FIG. 9C
FIG. 9D

SYSTEMS AND METHODS FOR CONTROLLING MOISTURE INGRESS IN AIRCRAFT SKIN MOUNTED ELECTRONICS

FIELD

The present disclosure, in some aspects thereof, relates to the field of moisture control and, more particularly, but not exclusively, to moisture control in an aircraft.

BACKGROUND

In an aircraft, the outer skin is spaced from the walls and ceiling of a passenger cabin (or other compartment), and the gap is at least partially filled with an insulation layer or blanket. During a flight, liquid from moist air can condense against the skin, particularly at the top of the fuselage, and freeze during cruise. During descent, this frozen liquid can thaw and drip down, but often running along or near the inboard surface of the skin and usually collecting in the bilge of the aircraft fuselage. Further, various liquid reservoirs and fluid transporting systems within the aircraft fuselage are at risk of leakage.

Typically, multiple electrical connectors to aircraft sensors and other sensitive instruments are located on or near the skin. Moisture that comes in contact with these electrical connectors can cause corrosion, and ultimately the electronics may fail. At particular risk are electrical connectors located in or near the bilge where liquid moisture collects. These failures cause delays in flight services due to fault signals and replacement of the electronics.

Current electronic components mounted to aircraft skins utilize sealants, rubber caps, rubber plugs and wire wraps to limit moisture incursion into the electronics. These methods are at risk of degradation and failure.

BRIEF SUMMARY

According to an aspect of the present disclosure there is provided a system for controlling moisture ingress, comprising: a moisture diverter comprising a substantially planar base flange, configured to sealingly engage an underlying surface of an aircraft, and, a shroud having a moisture impermeable wall extending inboard from the base flange and defining an enclosure therein for enclosing an electrical connector.

In some aspects, the system further comprises a vertical slot in a downslope portion of the moisture impermeable wall of the shroud.

In some aspects, the shroud permits liquid moisture within the enclosure to drain out through the vertical slot.

In some aspects, the slot has a width adequate to allow unimpeded draining of liquid moisture from the enclosure.

In some aspects, the system further comprises a backflow gate extending inboard from the base flange and aligned with the vertical slot in a manner such that the backflow gate blocks upslope flow of liquid moisture into the enclosure through the vertical slot.

In some aspects, the backflow gate is configured to redirect water flowing towards the vertical slot to flow around the perimeter of the shroud.

In some aspects, the backflow gate has a width greater than a width of the vertical slot.

In some aspects, the backflow gate has a generally rectangular prism shape.

In some aspects, the backflow gate has a generally triangular prism shape.

In some aspects, the backflow gate has a generally convex shape relative to the vertical slot.

In some aspects, the moisture impermeable wall has a circular or ovoid shape.

In some aspects, the moisture impermeable wall has a height of at least 1.5 inches.

In some aspects, the system further comprises a cover plate disposed over the shroud in a spaced-apart manner, positioned to at least cover the enclosure.

In some aspects, the cover plate is provided with at least one upturned side edge.

In some aspects, the cover plate is provided with an upturned front edge.

In some aspects, the front edge is provided with at least one slot to allow liquid moisture trapped on top of the cover plate to exit in a downslope direction.

In some aspects, the cover plate is wider than an intercostal space in which the electrical connector is mounted.

In some aspects, the cover plate is removably disposed over the shroud.

In some aspects, the system further comprises a gasket disposed between the base flange and the underlying surface.

There is further provided in accordance with an aspect, a method of controlling moisture ingress using a system for controlling moisture ingress, comprising: diverting moisture flow around an electrical connector using a shroud of a moisture diverter which forms an enclosure around the electrical connector; permitting moisture which accumulates within the enclosure to exit through a vertical slot disposed in a downslope side of the shroud; and, obstructing upslope moisture flow into the vertical slot with a backflow gate.

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of aspects of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some aspects of the disclosure are herein described, by way of example only, with reference to the accompanying drawings. With specific reference now to the drawings in detail, it is stressed that the particulars shown are by way of example, are not necessarily to scale, and are for purposes of illustrative discussion of aspects of the disclosure. In this regard, the description taken with the drawings makes apparent to those skilled in the art how aspects of the disclosure may be practiced.

In the drawings:

FIGS. 9A-9D are top, perspective, front and side views of an exemplary moisture diverter of the exemplary moisture ingress controlling system of FIG. 3;

DETAILED DESCRIPTION

Figure 1:
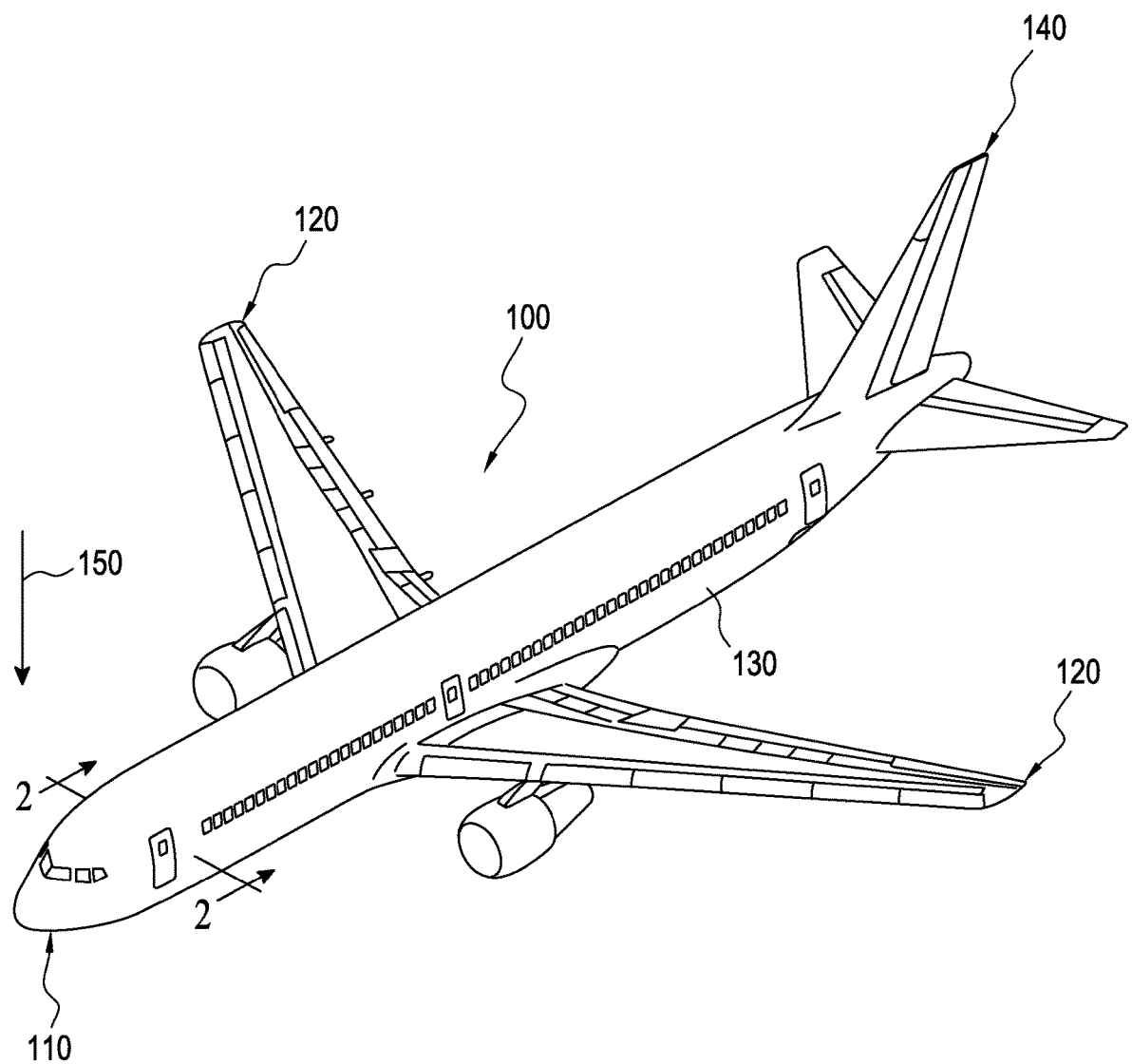
FIG. 1 is a schematic diagram of an aircraft.

The present disclosure, in some aspects thereof, relates to the field of moisture control and, more particularly, but not exclusively, to moisture control in an aircraft.

Before explaining at least one aspect of the disclosure in detail, it is to be understood that the disclosure is not necessarily limited in its application to the details of construction and the arrangement of the components and/or methods set forth in the following description and/or illustrated in the drawings. The disclosure is capable of other aspects or of being practiced or carried out in various ways.

Referring now to the drawings, FIG. 1 shows an aircraft 100 that includes a nose 110, wings 120, a fuselage 130, and a tail 140. FIG. 1 also illustrates a downward arrow 150 indicating the expected direction in which the force of gravity will pull objects, such as liquid water, onboard an aircraft 100 in a nominal operational profile. As used herein, "down", "downward" and "bottom" generally correspond to the direction of arrow 150, while "up", "upper" and "top" are generally in the opposite direction of the arrow 150.

Figure 2:
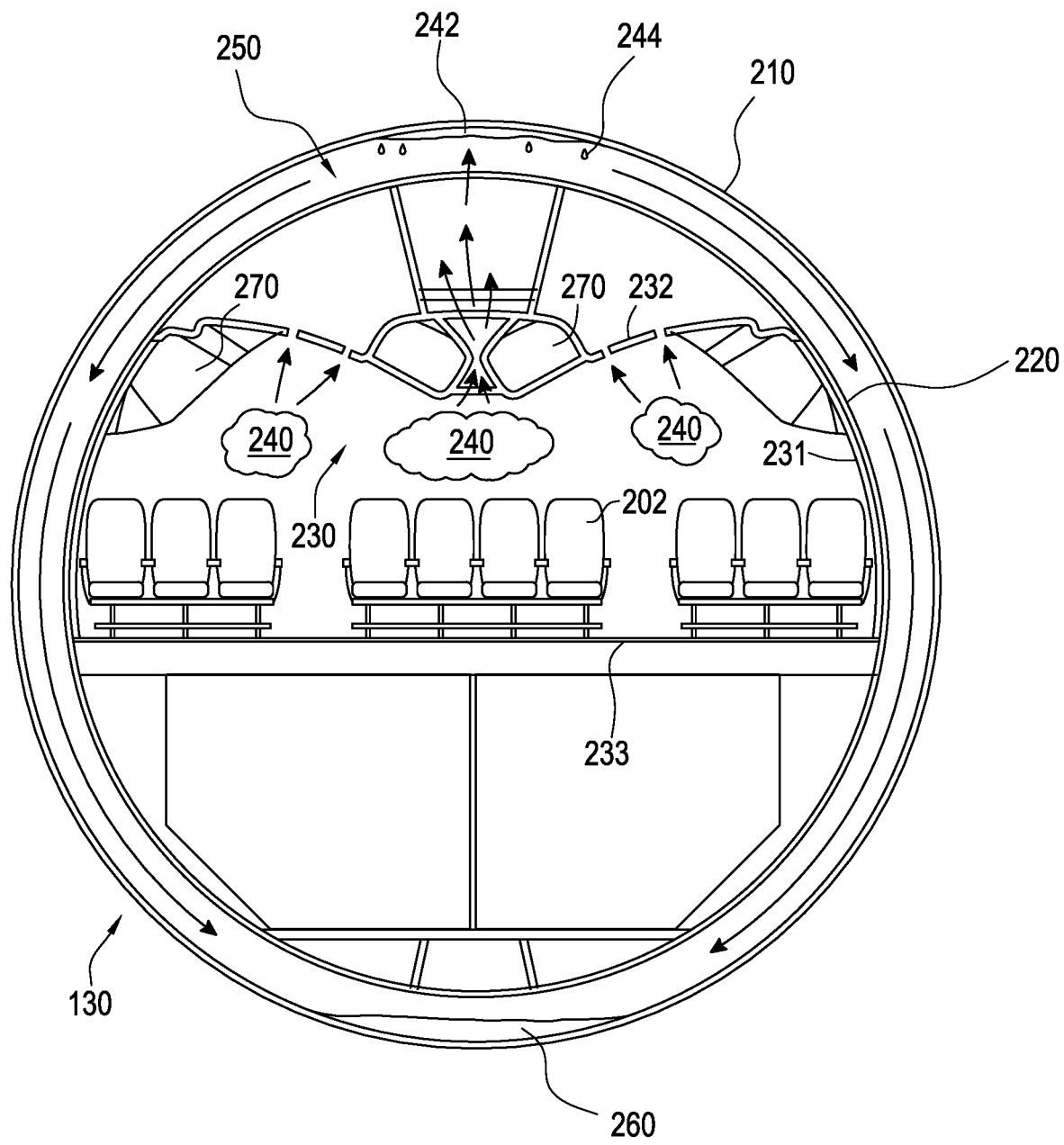
FIG. 2 is an exemplary cross-sectional, schematic view of the aircraft shown in FIG. 1.

FIG. 2 is a cross-sectional, schematic view of the aircraft 100 indicated by view arrows 2 in FIG. 1. FIG. 2 illustrates a portion of the aircraft fuselage 130, simplified for easier understanding of this Description. The fuselage 130 includes side walls 231, a ceiling 232, and a floor 233, which define the passenger cabin 230. Passengers in the aircraft 100 may congregate in seats 202 of the cabin 230 during flight. FIG. 2 illustrates that, inside of the fuselage 130 (e.g. in cabin 230), respiration and other sources of water cause moisture 240 to enter or form in the air in the cabin 230. For example, warm exhaled air includes moisture 240 and rises upward through luggage compartments/stowage bins 270. Some of this warm and moist air rises through the ceiling 232. Furthermore, some warm air continues to rise upward through an insulation layer 220 (or insulation blanket) into a space 250 between the insulation layer 220 and an outer wall 210 of the aircraft, also known as the aircraft skin, particularly in the crown/upper area of the fuselage.

Figures 4, 4A:
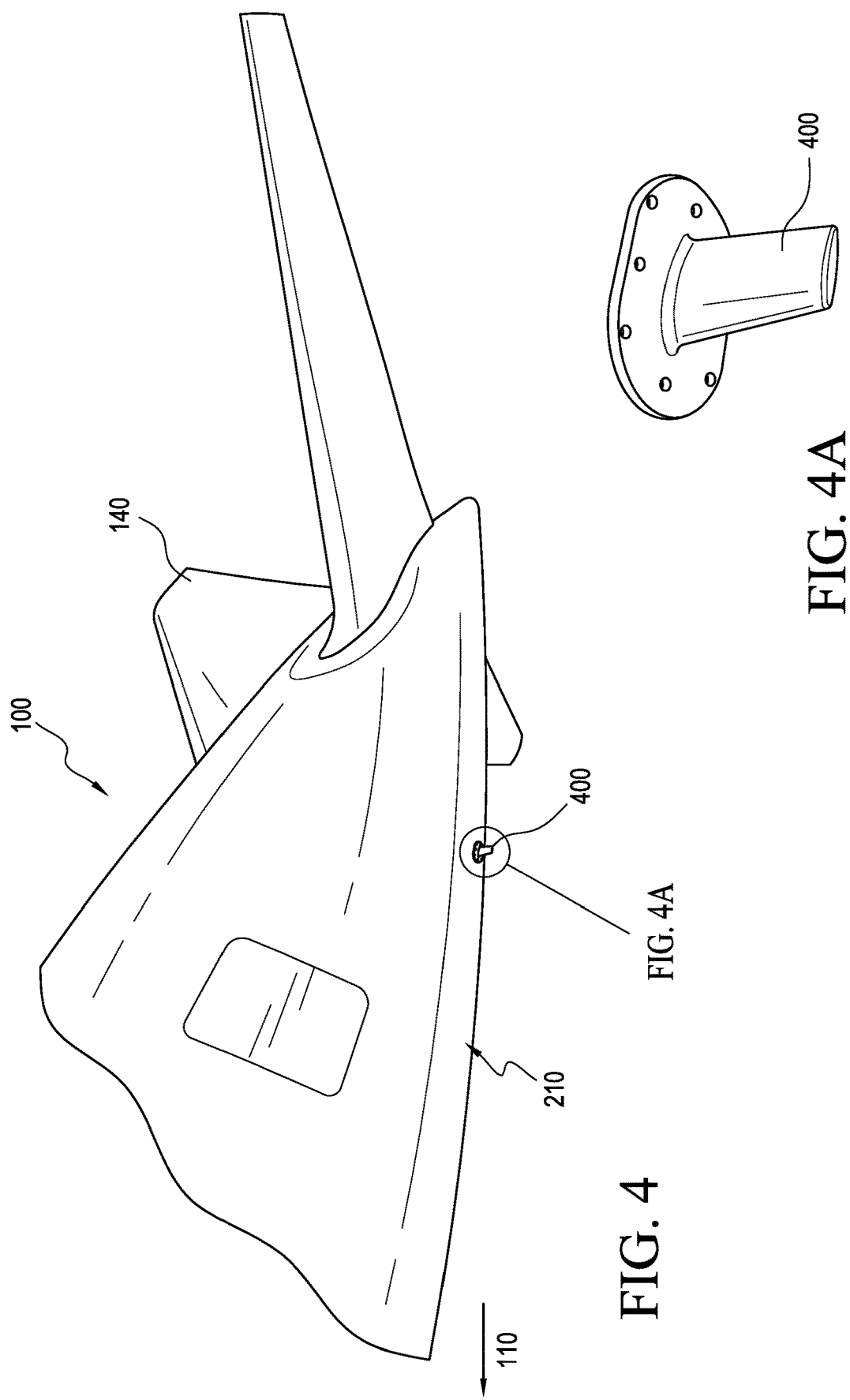
FIG. 4 is a perspective, bottom view of an aft section of an aircraft including a tail strike sensor.
FIG. 4A is close-up perspective view of the tail strike sensor of FIG. 4.

As the skin 210 is cooled by the outside air at high altitude during flight, the temperature of the skin 210 eventually decreases to a temperature below the freezing temperature of water. This cooling causes moisture 240 (e.g., water) to condense out of the air in the space 250 and freeze onto the inner surface of the skin 210 as ice 242. As the aircraft changes to a lower altitude and/or commences descent for landing and the temperature increases, the ice 242 can begin to melt causing moisture droplets 244 to travel through the space 250 towards the bottom 260 of the fuselage 130, drawn by gravity 150. The size of the space 250 has been exaggerated somewhat in FIG. 2 in order to more clearly show the details of the structure. For simplicity, common aircraft load bearing components such as stringers and/or frame members are not shown in FIG. 2. The liquid moisture 244 which traverses through the aircraft innards and accumulates at the bottom 260 of the fuselage 130 creates moisture-related issues for skin mounted electronics which are affixed to the aircraft fuselage, for example a tail strike sensor, an example of which is shown in FIG. 4.

In addition to the melted condensation moisture issue, various liquid storage tanks, such as waste water, are often located near the bottom of the aircraft fuselage 130. These tanks, or the plumbing connecting them to the rest of the aircraft, can leak, causing moisture related problems for skin mounted electronics where the leaked moisture accumulates at the bottom 260 of the aircraft fuselage 130.

Figure 3:
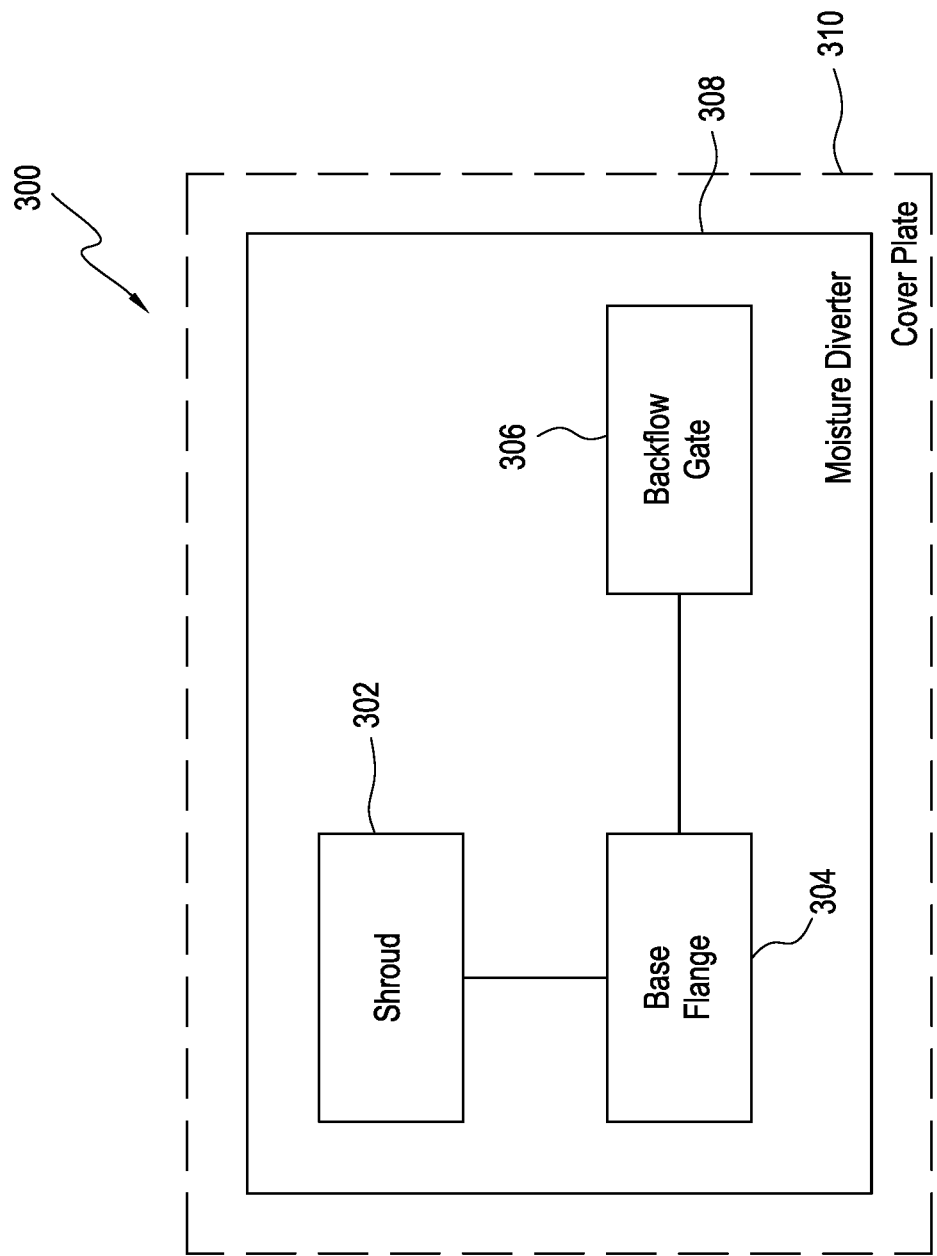
FIG. 3 is a block diagram of an exemplary moisture ingress controlling system.

FIG. 3 is a block diagram of an exemplary moisture ingress controlling system 300 for particular use in sloped portions of the aircraft fuselage 130. The moisture ingress controlling system includes a moisture diverter 308 which comprises a shroud 302 and/or a base flange 304 and/or a backflow gate 306. In an aspect, the moisture ingress controlling system 300 also includes a cover plate 310. It should be understood that the block diagram of FIG. 3 illustrates a generalized example of a moisture ingress controlling system 300, while specific examples and/or varying views of the shroud 302, the base flange 304, the backflow gate 306 and the cover plate 310 are shown in FIGS. 5B-10.

In an aspect, the moisture diverter 308 is configured to prevent liquid moisture from negatively affecting (e.g. corrosion and/or electrical malfunction) aircraft skin mounted electronics, for example by providing a shroud 302 which substantially encloses (particularly from the perspective of moisture flow down the slope of the aircraft fuselage 130) an electrical connector which is located inboard of the aircraft skin, defining an enclosure around the electrical connector, around which moisture flows. The shroud 302 may comprise a material that is moisture impermeable, in an aspect, thereby preventing moisture from traversing from outside the shroud 302 into the enclosure where the electrical connector is located, including during descent, takeoff, landing, cruise, and banking of the aircraft. In an aspect, the shroud 302 is a wall formed around the electrical connector, for example in a circular or ovoid or diamond or square or rectangular or multi-sided or any other shape which can be formed around the electrical connector and divert liquid moisture around the wall. In an aspect, the height of the shroud 302 wall is proportional to the height of the electrical connector such that the shroud 302 wall extends at least approximately to the height of the electrical connector. In some aspects, the height of the wall is at least 1.5 inches (3.8 cm). In some aspects, the height of the wall is at least 2 inches (5 cm). The moisture diverter 308 can be made out of any number of moisture resistant/corrosion resistant materials (Ultem, Nylon, Phenolic, acrylic, Acetal Delrin, etc).

In some aspects, the shroud 302 is configured with a slot in the shroud 302, on a down slope side, to permit moisture which accumulates within the shroud 302 to exit the enclosure. In an aspect, the moisture diverter 308 includes a backflow gate 306 spaced apart from the shroud 302 and down slope from the slot in the shroud 302 such that moisture can flow from inside the enclosure out, and down slope, but not back into the enclosure since the backflow gate 306 obstructs the slot. In some aspects, an upslope side of the backflow gate 306 is shaped to facilitate downslope/stream flow of moisture exiting from the enclosure, for example by being angled in a generally convex orientation away from the slot.

In some aspects, the shroud 302 and/or the backflow gate 306 are disposed on a base flange 304, for example to maintain the shroud 302 and the backflow gate 306 in a constant relationship to each other and/or to facilitate mounting the shroud 302 and/or the backflow gate 306 to the inboard side of the aircraft skin 210 (or even another surface or surfaces). In an aspect, the base flange 304 is substantially planar. In some aspects, the base flange 304 sealingly (i.e. moisture impermeably) attaches to the aircraft skin 210, preventing moisture from entering the enclosure from under the base flange 304. Optionally, a gasket is disposed between the base flange 304 and the aircraft skin 210 to prevent moisture ingress.

In some aspects, the cover plate 310 is placed above the shroud 302, the base flange 304 and/or the backflow gate 306 to prevent liquid moisture from dripping directly into the enclosure from the open top of the enclosure. Optionally, the cover plate 310 is removably fastened above the moisture diverter 308, for example using hook and pile fasteners.

FIG. 4 is a perspective, bottom view of an aft section of an aircraft 100 including a tail strike sensor 400, which is shown in closer detail in FIG. 4A. From this perspective, it can be seen that the tail strike sensor 400 is mounted to the skin 210 of the aircraft where the aft section is sloped downwards from the tail 140 moving towards the nose 110. As described elsewhere herein in more detail, the shroud 302 is oriented so that in particular any moisture flowing from the tail 140 towards the nose 100, in a downslope direction, is prevented from entering the enclosure formed by the shroud 302 and optionally, moisture which does accumulate within the enclosure can exit via an optional slot disposed in the shroud 302 in a downslope direction (the side of the shroud 302 facing the nose 110).

Figure 5B:
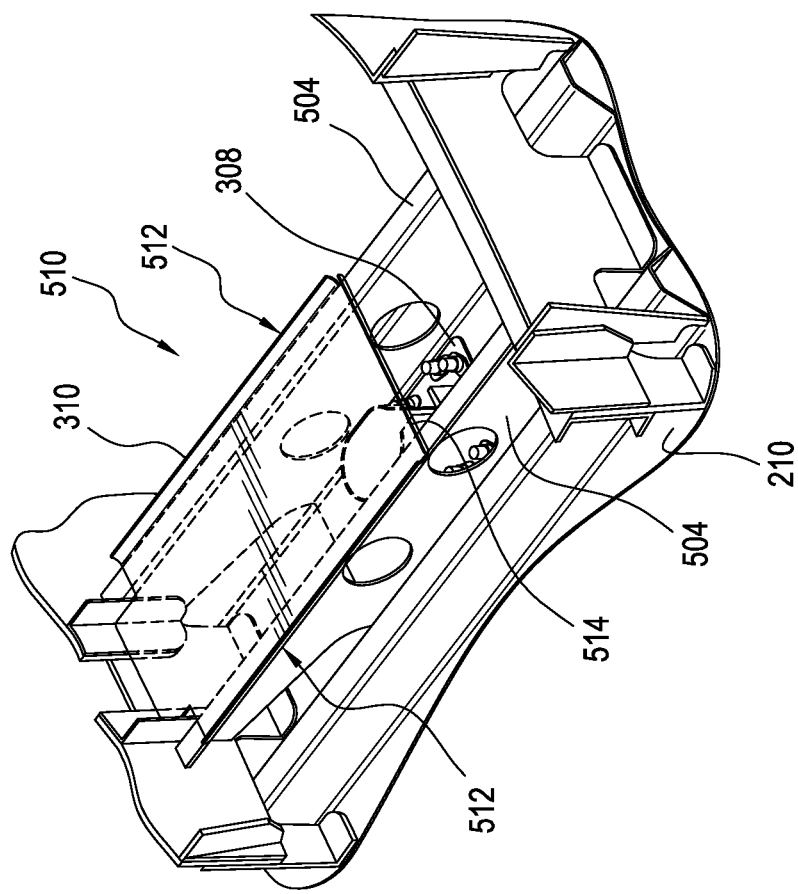
FIG. 5B is an exemplary aircraft skin equipment mounting configuration including the moisture ingress controlling system of FIG. 3.
Figure 5A:
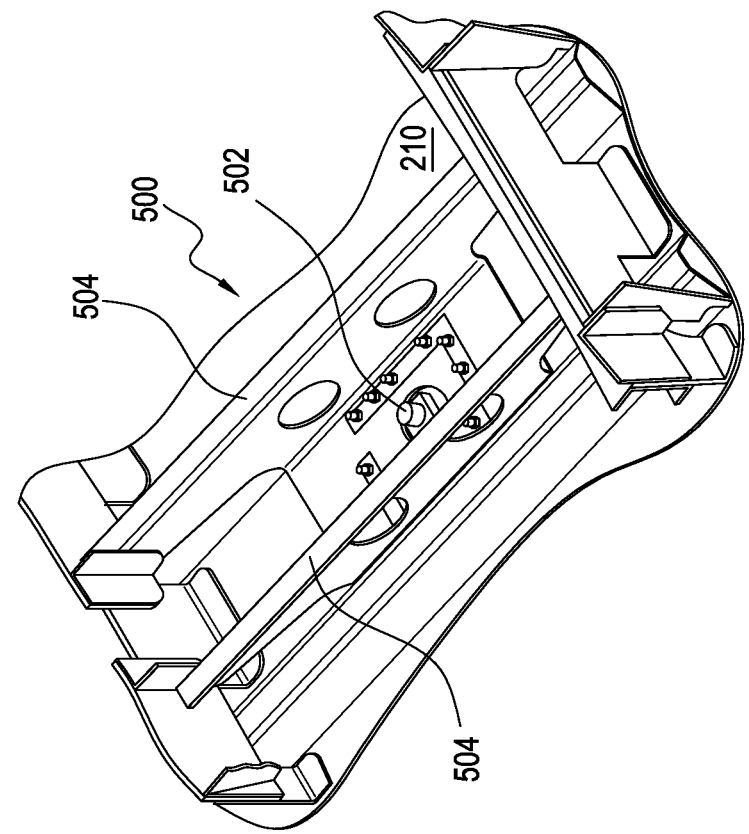
FIG. 5A is a prior art aircraft skin equipment mounting configuration.

FIG. 5A is a prior art inboard aircraft skin equipment mounting configuration 500 which shows the lack of both a moisture diverter 308 and a cover plate 310, leaving an electrical connector 502 unprotected from downslope moisture flow, vertical moisture dropping down, and upslope moisture flow which occurs during in-flight aircraft maneuvering. Conventionally, the electrical connector 502 is mounted onto the aircraft skin 210 between two intercostals 504.

FIG. 5B is an exemplary inboard aircraft skin equipment mounting configuration 510 including an exemplary moisture ingress controlling system 300 comprising a moisture diverter 308 and a cover plate 310. In an aspect, the cover plate 310 is removably attached to the two intercostals 504 between which the electrical connector is affixed to the aircraft skin 210. Optionally, the cover plate 310 extends over the width of the intercostals 504 such that any moisture flow over the side edges 512 of the cover plate 310 will fall into adjacent intercostal spaces, not the space where the electrical connector is affixed. Optionally, a front edge 514 of the cover plate 310 extends downslope past the moisture diverter 308 such that any moisture flow over the front edge 514 of the cover plate 310 falls downslope of the electrical connector and not into the enclosure formed by the shroud of the moisture diverter 308.

Figure 6:
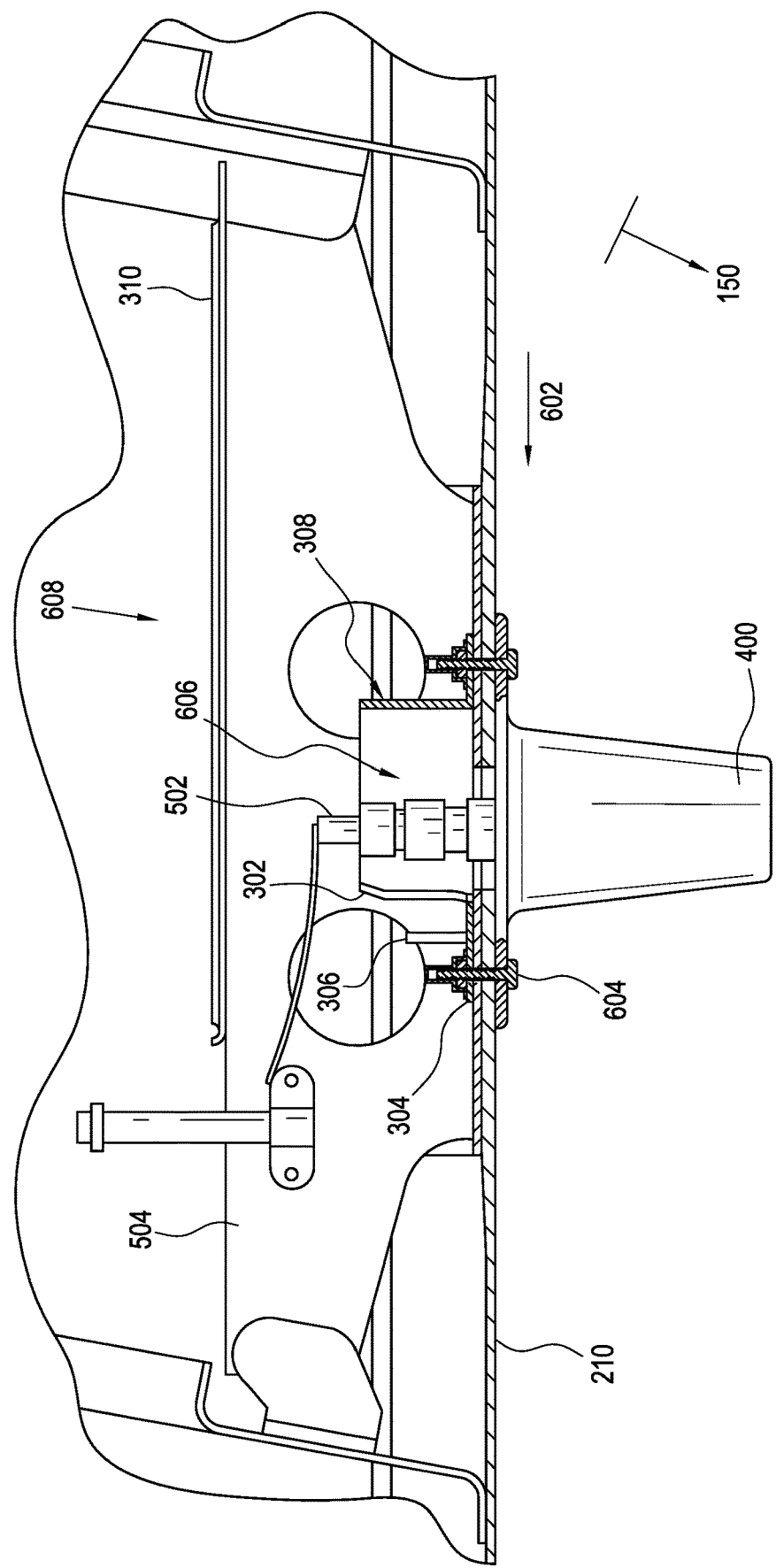
FIG. 6 is a cross-sectional view of an aircraft skin mounted tail strike sensor with the moisture ingress controlling system of FIG. 3.

FIG. 6 is a cross-sectional view of an aircraft skin 210 mounted tail strike sensor 400 with an example of the moisture ingress controlling system 300 including a moisture diverter 308 and a cover plate 310. In an aspect, the base flange plate 304 is mounted to the aircraft skin 210 using the same fasteners as are used by the tail strike sensor 400 for mounting the tail strike sensor 400 to the skin 210. Optionally, one of the fasteners 604 could screw into a structure configured to function as the backflow gate of the moisture diverter 308 (instead of having a separate backflow gate 306, as shown in FIG. 6), while also fastening down the base flange plate 304. It can be seen in FIG. 6 that the shroud 302 forms an enclosure 606 around the electrical connector 502 such that moisture flow in the downslope direction 602 is diverted around the electrical connector 502. Further, it can be seen that the cover plate 310 prevents any vertical moisture 608 from dripping into the enclosure 606.

Figure 7:
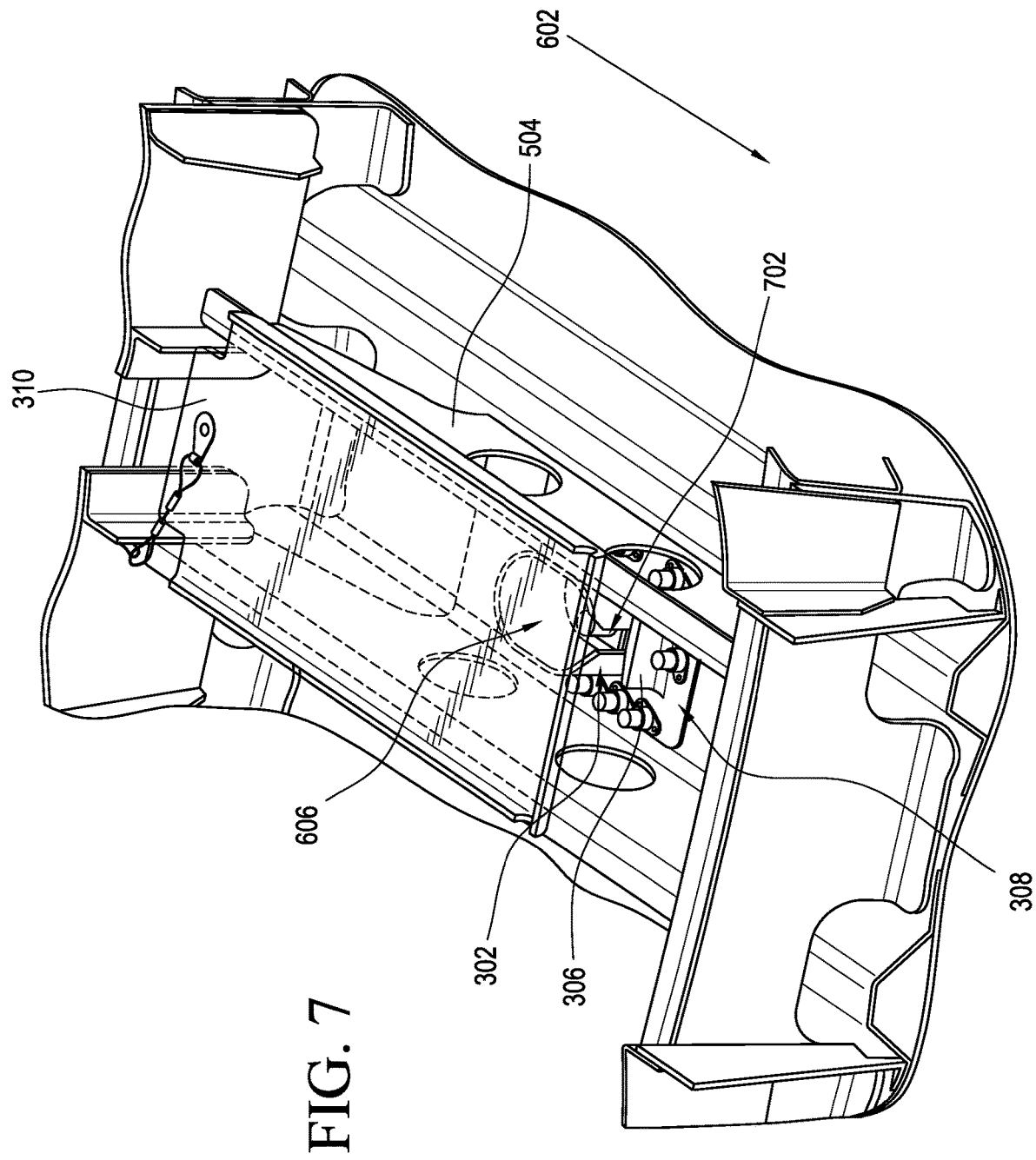
FIG. 7 is a perspective view of an exemplary moisture ingress controlling system of FIG. 3.

FIG. 7 is a perspective view of an exemplary moisture ingress controlling system 300 including a moisture diverter 308 and a cover plate 310. Shown in more detail in FIG. 7 is a slot 702 which can be formed into the shroud 302 to permit accumulated moisture within the enclosure 606 to exit and flow downslope 602. The slot 702 can be virtually any shape as long as it allows liquid moisture within the enclosure 606 to drain out. Optionally, the slot 702 is rectangular shaped. Optionally, the slot 702 is v-shaped. Optionally, the slot 702 is rounded. In some aspects, the slot does not exhibit the same height as the wall, for example, being open only near the aircraft skin and closed near the top of the wall.

Figure 8:
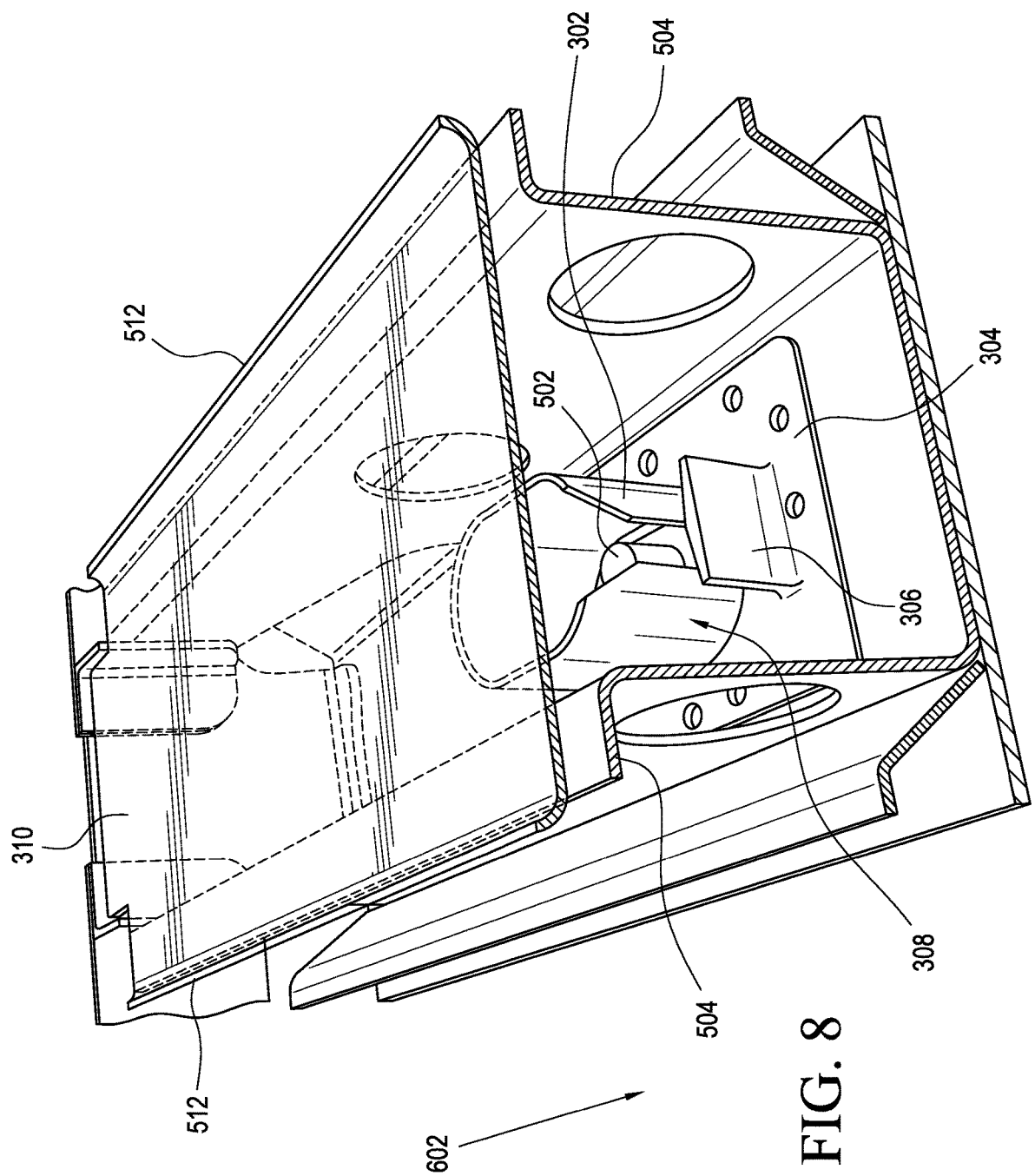
FIG. 8 is a different perspective view of the exemplary moisture ingress controlling system of FIG. 3.

FIG. 8 is a different perspective view of an exemplary moisture ingress controlling system 300, including a moisture diverter 308 and a cover plate 310. From this perspective, the side edges 512 of the cover plate 310 which extend over the width of the intercostals 504 is shown in more detail. In some aspects, the side edges 512 are curved upwards to trap moisture on top of the cover plate 310 and route it in a downslope direction 602 towards the front edge of the cover plate (the front edge has been cut-off in this view), where the moisture falls downslope of the moisture diverter 308. Optionally, the front edge of the cover plate is also curved upwardly, but is provided with at least one slot, shown in more detail in FIG. 10, which functions as an exit for moisture trapped on top of the cover plate 310.

FIGS. 9A-9D are top, perspective, front and side views, respectively, of an exemplary moisture diverter 308 of the moisture ingress controlling system 300, in an aspect. FIGS. 9A and 9B show more clearly the upslope side 902 of the backflow gate 306 can be shaped to facilitate downslope/stream flow of moisture exiting from the enclosure, for example by being angled in a convex orientation away from the slot 702, wherein the flow of moisture out of the slot 702 is directed around the backflow gate 306 and towards the downslope direction 602. While the upslope side 902 is described as being convex with respect to the slot 702, it should be understood that the backflow gate 306 could be virtually any shape which allows downslope flow from the slot 702 and prevents upslope flow from an intercostal space forward (on the nose 110 side) of the moisture diverter 308. In some aspects, the backflow gate 306 is prism-shaped, for example generally rectangular or triangular.

Figure 10:
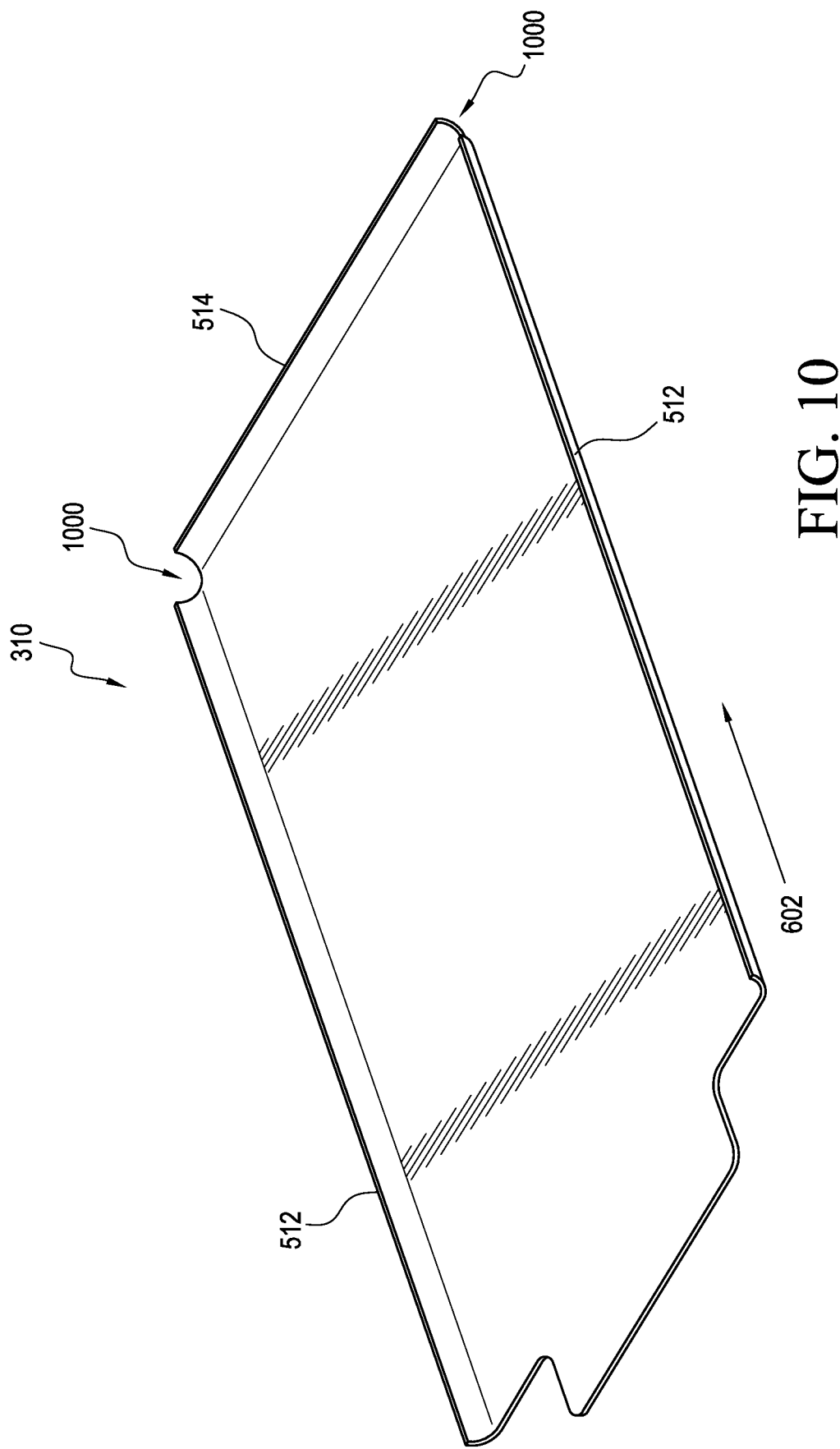
FIG. 10 is a perspective view of an exemplary cover plate of the exemplary moisture ingress controlling system of FIG. 3; and, FIG. 11 is a flowchart of a method of controlling moisture ingress in aircraft skin mounted electronics.

FIG. 10 is a perspective view of an exemplary cover plate 310 of the exemplary moisture ingress controlling system 300. At least one slot 1000 is provided to the front edge 514 of the cover plate 310 to allow moisture trapped on top of the cover plate 310 to exit in a downslope 602 direction. In some aspects, the at least one slot 1000 is positioned on the cover plate 310 such that moisture exiting the at least one slot 1000 falls into an adjacent intercostal space, not the immediate space where the electrical connector 502 is affixed to the skin 210. In an aspect, the front edge 514 is curved upwardly in order to prevent moisture from falling off the cover plate 310 and into the immediate intercostal space.

Figure 11:
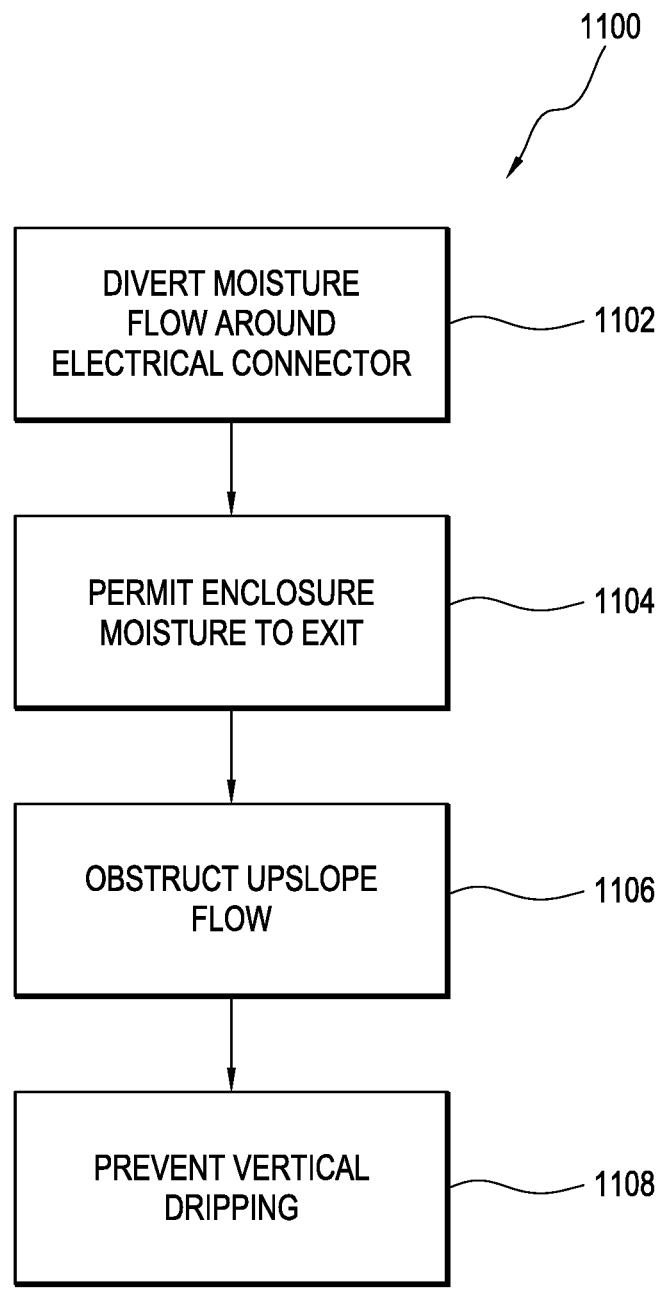

FIG. 11 is a flowchart 1100 of a method of controlling moisture ingress in aircraft skin mounted electronics using a moisture ingress control system 300. In an aspect, downslope 602 moisture flow is diverted (1102) around an electrical connector 502 using a shroud 302 of a moisture diverter 308 which forms an enclosure 606 around the electrical connector 502. Moisture which accumulates within the enclosure 606 is permitted (1104) to exit the enclosure through a slot 702 disposed in a downslope side of the shroud 302. In some aspects, upslope moisture flow is obstructed (1106) by the backflow gate 306, preventing the upslope flow from entering back into the slot 702. Vertically dripping moisture 608 is optionally prevented (1108) from dripping into the enclosure 606 by optionally removably attaching a cover plate 310 to the intercostals 504 on either side of the electrical connector 502.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various aspects of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range. Further, described ranges are intended to include numbers outside any range described within statistical error and/or inherent measurement equipment limitations.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the disclosure, which are, for clarity, described in the context of separate aspects, may also be provided in combination in a single aspect. Conversely, various features of the disclosure, which are, for brevity, described in the context of a single aspect, may also be provided separately or in any suitable subcombination or as suitable in any other described aspect of the disclosure. Certain features described in the context of various aspects are not to be considered essential features of those aspects, unless the aspect is inoperative without those elements.

Although the disclosure has been described in conjunction with specific aspects thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

What is claimed is:

1. A system for controlling moisture ingress to an electronic device positioned on a skin of an aircraft, the system comprising:
    a substantially planar base flange with a first side and an opposing second side, the first side of the base flange shaped to sealingly engage with the skin of the aircraft;
    a shroud having a moisture impermeable wall that extends inboard from the second side of the base flange and defining an enclosure therein for enclosing the electronic device, the moisture impermeable wall extending upward from the base flange to a height and including an upper edge of the wall positioned away from the base flange; and
    a slot that extends through the moisture impermeable wall from the upper edge to the base flange to permit the moisture that accumulates within the enclosure to exit.

2. The system according to claim 1, wherein the moisture impermeable wall comprises an oval shape with an upstream portion and a downstream portion, the slot positioned in the downslope portion of the moisture impermeable wall of the shroud.

3. The system according to claim 1, wherein the slot has a height measured from the upper edge to the base flange and a width measured perpendicular to the height, the height being greater than the width.

4. The system according to claim 1, further comprising a backflow gate extending inboard from the second side of the base flange and having first and second exposed vertical edges and an exposed upper edge opposite from the base flange that extends between the first and second exposed vertical edges, the backflow gate being aligned with the slot to block an upslope flow of the moisture into the enclosure through the slot.

5. The system according to claim 4, wherein the backflow gate is spaced along the base flange laterally away from the slot and is configured to redirect the moisture flowing towards the slot to flow around an outer perimeter of the shroud.

6. The system according to claim 4, wherein the backflow gate has a width greater than a width of the slot.

7. The system according to claim 4, wherein the backflow gate has a rectangular prism shape.

8. The system according to claim 4, wherein the backflow gate has a triangular prism shape.

9. The system according to claim 4, wherein the backflow gate has a convex shape relative to the slot.

10. The system according to claim 1, wherein the moisture impermeable wall has a circular or ovoid shape.

11. The system according to claim 1, further comprising a cover plate disposed over the upper edge of the moisture impermeable wall of the shroud and is sized to at least cover the enclosure.

12. The system according to claim 11, wherein the cover plate comprises at least one upturned side edge.

13. The system according to claim 11, wherein the cover plate comprises an upturned front edge.

14. The system according to claim 13, wherein the front edge comprises at least one slot to allow liquid moisture trapped on top of the cover plate to exit in a downslope direction.

15. The system according to claim 1, further comprising a gasket disposed between the first side of the base flange and the skin.

16. A method of controlling moisture ingress to an electronic device positioned at a wall of an aircraft, comprising:
positioning a diverter at the electronic device with a flange of the diverter attached to the wall of the aircraft and a shroud that extends from the flange extending around the electronic device;
positioning a slot in the shroud at a downslope side of the electronic device and positioning a moisture impermeable wall around a remainder of the electronic device;
diverting moisture flow around the electronic device using the shroud which forms an enclosure around the electronic device;
permitting moisture which accumulates within the enclosure to exit through the slot; and,
positioning a backflow gate at an upslope side of the slot and obstructing upslope moisture flow from entering into the slot with the backflow gate.

17. The method of claim 16, further comprising the backflow gate being wider than the slot.

18. A system for controlling moisture ingress to an electronic device positioned on a skin of an aircraft, the system comprising:
a base flange configured to be mounted to the skin of the aircraft, the base flange comprising a first side and an opposing second side;
a shroud that extends upward from the second side of the base flange, the shroud comprising a lower edge at the base flange and an upper edge positioned away from the base flange, the shroud forming an enclosure sized to extend around the electronic device and with a slot to permit moisture within the enclosure to exit; and
a backflow gate that extends outward from the second side of the base flange and is separate from the shroud and is aligned at the slot, the backflow gate having a width measured between opposing edges that is greater than a width of the slot to extend across the slot.

19. The system of claim 18, wherein the backflow gate is wider than the slot.

20. The system according to claim 18, wherein the shroud comprises an exposed upper edge away from the base flange, and further comprising a cover plate that is sized to extend over the enclosure and is spaced away from the exposed upper edge of the shroud.

* * * * *